United States Patent
Yi et al.

(10) Patent No.: US 9,864,206 B2
(45) Date of Patent: Jan. 9, 2018

(54) OPTICAL MODULATION DEVICE INCLUDING LIQUID CRYSTALS, DRIVING METHOD THEREOF, AND OPTICAL DISPLAY DEVICE USING THE SAME

(71) Applicant: SAMSUNG DISPLAY CO., LTD., Yongin, Gyeonggi-do (KR)

(72) Inventors: Jung Hwan Yi, Yongin-si (KR); Kyung Ho Jung, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 43 days.

(21) Appl. No.: 14/751,318

(22) Filed: Jun. 26, 2015

(65) Prior Publication Data
US 2016/0202510 A1    Jul. 14, 2016

(30) Foreign Application Priority Data
Jan. 12, 2015    (KR) .................. 10-2015-0004404

(51) Int. Cl.
*G02F 1/137*    (2006.01)
*G02B 27/26*    (2006.01)
(Continued)

(52) U.S. Cl.
CPC ........... *G02B 27/26* (2013.01); *G02B 5/1876* (2013.01); *G02B 5/1885* (2013.01);
(Continued)

(58) Field of Classification Search
CPC .............................. G02B 27/26; G02B 5/1885
See application file for complete search history.

(56) References Cited

U.S. PATENT DOCUMENTS 8,913,204 B2 * 12/2014 Kim ..................... G09G 3/2025
345/107
2011/0228181 A1 * 9/2011 Jeong ................... G02B 5/1842
349/15
(Continued)

FOREIGN PATENT DOCUMENTS

JP    2004-004199    1/2004
KR    1020110104701    9/2011
(Continued)

*Primary Examiner* — Sang V Nguyen
(74) *Attorney, Agent, or Firm* — F. Chau & Associates, LLC

(57) ABSTRACT

An optical modulation device includes a first electrode layer in which a plurality of electrodes are arranged and a second electrode layer, where the optical modulation device configures a Fresnel zone plate wherein groups of adjacent electrodes of the plurality of electrodes define zones of the Fresnel zone plate. A method of driving the optical modulation device includes applying a common voltage to the second electrode layer, applying starting voltages to the first electrode layer in a first step, applying lens voltages to the first electrode layer in a second step, where polarities of the lens voltages with respect to the common voltage are inverted for every zone, and an absolute difference between starting voltages applied to electrodes adjacent to a zone boundary in the first step is less than an absolute difference of the lens voltages applied to electrodes adjacent to a zone boundary in the second step.

21 Claims, 10 Drawing Sheets

(51) Int. Cl.
*G02F 1/29* (2006.01)
*G02B 5/18* (2006.01)
*G02B 27/22* (2006.01)
*G02F 1/1343* (2006.01)

(52) U.S. Cl.
CPC ........... *G02B 27/2214* (2013.01); *G02F 1/29* (2013.01); *G02F 1/134309* (2013.01); *G02F 2203/28* (2013.01)

(56) References Cited

U.S. PATENT DOCUMENTS

| | | | | |
|---|---|---|---|---|
| 2012/0105750 A1* | 5/2012 | Yoon | ................ | G09G 3/003 |
| | | | | 349/15 |
| 2012/0162550 A1* | 6/2012 | Jeong | ................ | H04N 13/0404 |
| | | | | 349/15 |
| 2013/0222713 A1* | 8/2013 | Park | ................ | G02B 27/2264 |
| | | | | 349/15 |
| 2015/0116612 A1* | 4/2015 | Song | ................ | G02B 27/2214 |
| | | | | 349/15 |
| 2015/0124183 A1* | 5/2015 | Choi | ................ | G02B 27/2214 |
| | | | | 349/15 |

FOREIGN PATENT DOCUMENTS

| | | |
|---|---|---|
| KR | 1020120025281 | 3/2012 |
| KR | 1020120028171 | 3/2012 |

* cited by examiner

Zone boundary (ZG)

OPTICAL MODULATION DEVICE INCLUDING LIQUID CRYSTALS, DRIVING METHOD THEREOF, AND OPTICAL DISPLAY DEVICE USING THE SAME

CROSS-REFERENCE TO RELATED APPLICATION

This application claims priority under 35 U.S.C. §119 from Korean Patent Application No. 10-2015-0004404 filed in the Korean Intellectual Property Office on Jan. 12, 2015, and all the benefits accruing therefrom, the contents of which are herein incorporated by reference in their entirety.

BACKGROUND (a) Technical Field

Embodiments of the present disclosure are directed to an optical modulation device, a driving method thereof, and an optical display device using the same, and more particularly, to an optical modulation device including liquid crystals, a driving method thereof, and an optical display device using the same.

(b) Discussion of the Related Art

Optical display devices that use an optical modulation device for modulating characteristics of light have been recently developed.

For example, for a 3-dimensional (3D) optical display device, an optical modulation device is used to divide an image into different viewpoints to be transmitted to a viewer so that the viewer can perceive the image as a stereoscopic image.

An optical modulation device that can be used in an autostereoscopic 3D image display device includes a lens, a prism, etc., that can alter a path of light to transmit the image of the display device to a desired viewpoint.

As such, a direction of incident light can be altered using light diffraction through phase modulation thereof.

When polarized light passes through an optical modulation device such as a phase retarder, its polarization state is changed.

For example, when circularly polarized light is incident on a half-wave plate, the circularly polarized light is output with its rotation direction reversed.

For example, when left circularly polarized light passes through the half-wave plate, right circularly polarized light is output.

In this case, a phase of the circularly polarized light shifts according to an optical axis of the half-wave plate, that is, a slow axis.

Specifically, when the optical axis of the half-wave plate rotates in-plane by $\varphi$, a phase of the outputted light shifts by $2\varphi$.

Thus, when the optical axis of the half-wave plate is spatially rotated in an x-axis direction by 180° ($\pi$ radians), the outputted light may be phase modulated or shifted by 360° ($2\pi$ radians) in the x-axis direction.

As such, when an optical modulation device induces a phase shift from 0 to $2\pi$ depending on position, a diffraction grating or prism for altering or diffracting the transmitted light can be implemented.

Liquid crystals may be used to adjust the optical axis of an optical modulation device, such as a half-wave plate, according to the position thereof.

In an optical modulation device implemented as a phase retarder using liquid crystals, the long axes of liquid crystal molecules, which are arranged by applying an electric field to a liquid crystal layer, may be rotated to change the phase modulation according to position.

The phase of the light output after passing through an optical modulation device may be determined by the directions of the longer axes of the aligned liquid crystal molecules, that is, an azimuthal angle.

A lens may be implemented using an optical modulation device that uses liquid crystal molecules to generate continuous phase modulation by aligning the liquid crystal molecules in a desired direction by application of a lens voltage.

However, in a region where there are strong horizontal and vertical fields due to large voltage differences, texture may be generated in 3D mode since alignment of the liquid crystal molecules is unstable.

SUMMARY

Exemplary embodiments of the present disclosure can provide an optical modulation device that can suppress texture by enhancing control over the liquid crystal molecules, a driving method thereof, and an optical display device using the same.

A method of driving an optical modulation device according to an exemplary embodiment of the present disclosure, the optical modulation device including a first electrode layer in which a plurality of electrodes are arranged and a second electrode layer, where the optical modulation device configures a Fresnel zone plate wherein groups of adjacent electrodes of the plurality of electrodes define zones of the Fresnel zone plate, the method comprises applying a common voltage to the second electrode layer, applying starting voltages to the first electrode layer in a first step, applying lens voltages to the first electrode layer in a second step, where polarities of the lens voltages with respect to the common voltage are inverted for every zone, and an absolute value of a difference between starting voltages applied to electrodes adjacent to a zone boundary in the first step is less than an absolute value of a difference between lens voltages applied to electrodes adjacent to a zone boundary in the second step.

Differences between lens voltages applied to the plurality of electrodes and the common voltage may decrease from an outermost side of a zone to a center of the zone, and, in the second step, lens voltages less than the common voltage may be applied to those electrodes to which a voltage greater than and closest to the common voltage Vcom was applied.

In the first step, the common voltage is applied to a centermost the electrode of the zone, which is the electrode of the zone closest to a center of the Fresnel zone plate.

A voltage less than the common voltage or a corresponding lens voltage may be applied to an electrode outward from and adjacent to the centermost electrode of the zone.

The common voltage may be applied as the lens voltage to the centermost electrode of the zone, and a lens voltage greater than the common voltage and closest to the common voltage is applied to an electrode that is outward from and adjacent to a centermost electrode of the zone, which is the electrode of the zone closest to a center of the Fresnel zone plate.

The lens voltages generate a phase delay in each zone, and lens voltages applied to corresponding electrodes of each zone generate the same phase delay for each zone.

In every zone, a voltage difference dV of the lens voltages applied to two electrodes of the plurality of electrodes adjacent to a zone boundary may be determined from a difference dVmax between the lens voltage applied to an outermost electrode of the zone and the lens voltage applied to the centermost electrode of the zone and an offset voltage a that is a difference between the lens voltage applied to the centermost electrode of the zone and the common voltage.

The voltage difference dV of the voltages applied to the two electrodes adjacent to the zone boundary may be dV=dVmax+2a.

The voltage difference dV of the lens voltages applied to two electrodes of the plurality of electrodes adjacent to the zone boundary is determined such that transmittance at the zone boundary is below a predetermined value.

Polarities of the lens voltages may be inverted for every zone and at a predetermined time interval through time inversion, where a positive polarity may change to a negative polarity and a negative polarity may change to a positive polarity.

An optical modulation device according to an exemplary embodiment of the present disclosure includes a first plate that includes a plurality of first electrodes; a second plate facing the first plate and that includes a second electrode; and a liquid crystal layer interposed between the first and second plates that include a plurality of liquid crystal molecules. The optical modulation device configures a Fresnel zone plate wherein groups of adjacent electrodes of the plurality of electrodes define zones of the Fresnel zone plate, wherein a common voltage is applied to the second electrode, starting voltages are applied to the plurality of first electrodes in a first step, lens voltages are applied to the plurality of first electrodes in a second step, polarities of the lens voltages with respect to the common voltage are inverted for every zone, and an absolute value of a difference between starting voltages applied to first electrodes adjacent to a zone boundary in the first step is less than an absolute value of a difference of the lens voltages applied to first electrodes adjacent to a zone boundary in the second step.

The plurality of first electrodes may comprise two arrays of electrodes insulated from each other.

Widths of the plurality of first electrodes may become smaller closer to the outer zones of the Fresnel zone plate.

Widths of the first electrodes may be identical in every zone.

The first plate and the second plate may respectively further include a first alignment layer and a second alignment layer for aligning the liquid crystal molecules of the liquid crystal layer.

An optical display device according to an exemplary embodiment of the present disclosure includes an optical modulation device. The optical modulation device includes a first plate that includes a plurality of first electrodes; a second plate facing the first plate and that includes a second electrode; and a liquid crystal layer interposed between the first and second plates that include a plurality of liquid crystal molecules. The optical modulation device configures a Fresnel zone plate wherein groups of adjacent electrodes of the plurality of electrodes define zones of the Fresnel zone plate, wherein a common voltage is applied to the second electrode, starting voltages are applied to the plurality of first electrodes in a first step, lens voltages are applied to the plurality of first electrodes in a second step, polarities of the lens voltages with respect to the common voltage are inverted for every zone, and an absolute value of a difference between starting voltages applied to first electrodes adjacent to a zone boundary in the first step is less than an absolute value of a difference of the lens voltages applied to first electrodes adjacent to a zone boundary in the second step.

Through two-step driving, the liquid crystal molecules can be easily controlled to improve a phase modulation characteristic of light. In addition, reproducibility of the phase modulation characteristic of the optical modulation device can be guaranteed. Accordingly, 3D display quality of the optical display device can be improved.

DETAILED DESCRIPTION OF EXEMPLARY EMBODIMENTS

Figure 1:
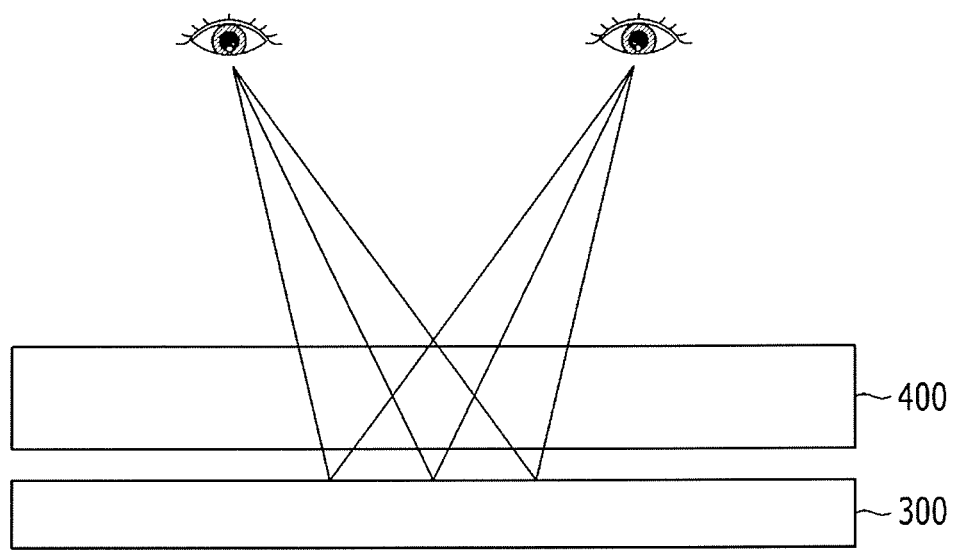
FIG. 1 illustrates a schematic structure of an optical display device according to an exemplary embodiment of the present disclosure and a method of generating a 2D image.

Embodiments of the present disclosure will be described more fully hereinafter with reference to the accompanying drawings, in which exemplary embodiments of the disclosure are shown.

As those skilled in the art would realize, the described embodiments may be modified in various different ways, all without departing from the spirit or scope of the present disclosure.

In the drawings, the thickness of layers, films, panels, regions, etc. may be exaggerated for clarity.

Like reference numerals may designate like elements throughout the specification.

It will be understood that when an element such as a layer, film, region, or substrate is referred to as being "on" another element, it can be directly on the other element or intervening elements may also be present.

FIG. 1 illustrates a schematic structure of an optical display device according to an exemplary embodiment of the present disclosure and a method of generating a 2D image.

Figure 2:
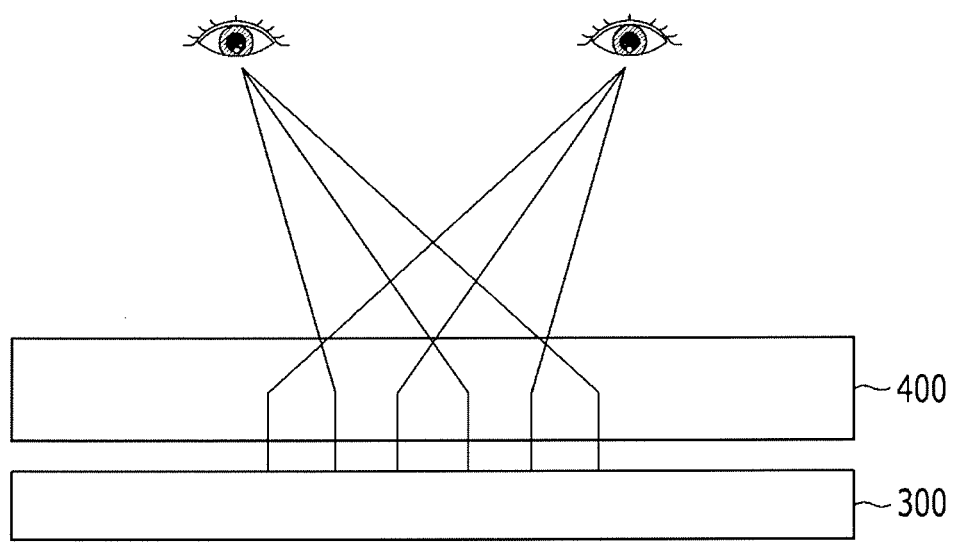
FIG. 2 illustrates a schematic structure of an optical display device according to an exemplary embodiment of the present disclosure and a method of generating a 3D image.

FIG. 2 illustrates a schematic structure of an optical display device according to an exemplary embodiment of the present disclosure and a method of generating a 3D image.

Referring to FIGS. 1 and 2, a display device includes a display panel 300 for displaying an image, and an optical modulation device 400 positioned in front of a surface of the display panel 300 on which the image is displayed.

The display panel 300 and the optical modulation device 400 may be operated in a 2D or 3D mode.

The display panel 300 may be any of various types of display panels, such as a plasma display panel, a liquid crystal display, an organic light emitting diode display, etc.

The display panel 300 includes a plurality of pixels PX for displaying the image arranged in a matrix form.

The display panel 300 displays a planar image in 2D mode, but in 3D mode, displays an image corresponding to various viewing zones, such as a left eye image and a right eye image, through a spatial or temporal division method.

For example, in 3D mode, the display panel 300 may alternately display a right eye image and a left eye image for every single column of pixels.

The optical modulation device 400 can operate in either 2D or 3D mode so that the image displayed on the display panel 300 is perceived as a 2D or 3D image.

In 2D mode, the optical modulation device 400 transmits the image displayed on the display panel 300 unchanged.

In 3D mode, the optical modulation device 400 separates the image displayed on the display panel 300 into viewing zones.

That is, the optical modulation device 400 in 3D mode allows a multi-viewpoint image that includes a left eye image and a right eye image displayed on the display panel 300 to be displayed at the corresponding viewing zones using diffraction and refraction of light.

FIG. 1 illustrates a case in which the display panel 300 and the optical modulation device 400 operate in 2D mode.

In 2D mode, the same image reaches a left eye and a right eye to be perceived as a 2D image.

FIG. 2 illustrates a case in which the display panel 300 and the optical modulation device 400 operate in 3D mode The optical modulation device 400 enables a 3D image to be perceived by dividing the image of the display panel 300 according to the viewing zones of the left and right eyes and then refracting them.

Figure 3:
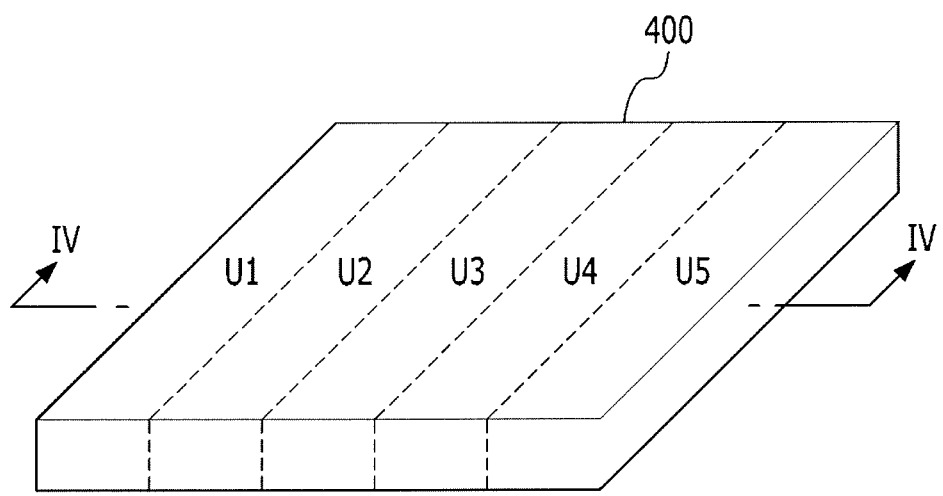
FIG. 3 is a perspective view of an optical modulation device included in an optical display device according to an exemplary embodiment of the present disclosure.

FIG. 3 is a perspective view of an optical modulation device included in an optical display device according to an exemplary embodiment of the present disclosure.

Figure 4:
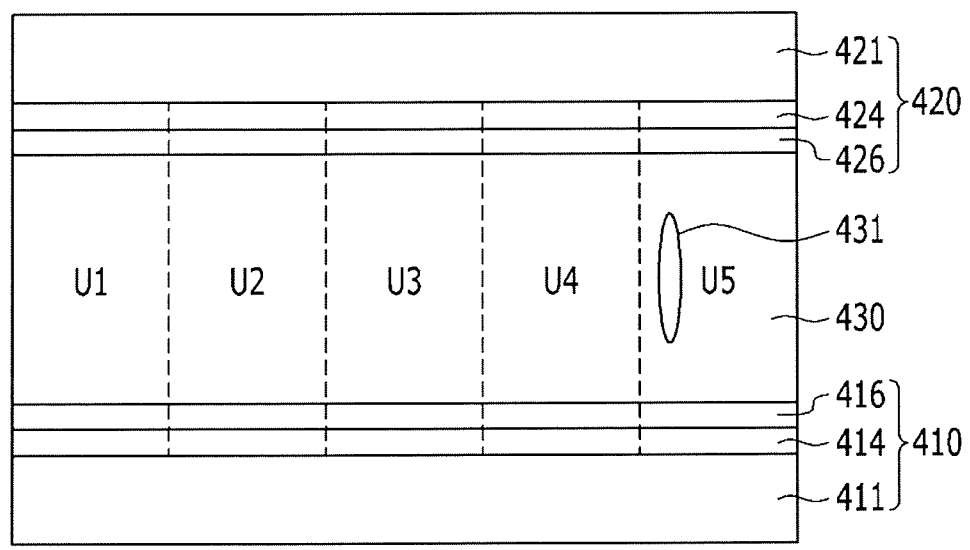
FIG. 4 is a cross-sectional view of a liquid crystal lens panel of FIG. 3 taken along the line IV-IV.

FIG. 4 is a cross-sectional view of a liquid crystal lens panel of FIG. 3 taken along the line IV-IV.

Referring to FIGS. 3 and 4, the optical modulation device 400 includes a plurality of unit elements U1 to U5 that are sequentially disposed in an x-axis direction.

In the drawings, five unit elements are displayed, but this arrangement is exemplary and non-limiting, and an optical modulation device may include different numbers of unit elements.

One unit element covers N viewpoints of the display panel 300, where N is a natural number.

One viewpoint corresponds to one pixel.

For example, one unit element may cover nine viewpoints.

One unit element may function as one lens.

The optical modulation device 400 includes first and second plates 410 and 420 facing each other, and a liquid crystal layer 430 interposed between the two plates 410 and 420.

The first plate 410 includes a first base substrate 411 that can be formed of glass, plastic, etc., and a first electrode layer 414 and a first alignment layer 416 that are disposed on the first base substrate 411. The second plate 420 includes a second base substrate 421, and a second electrode layer 424 and a second alignment layer 426 that are disposed on the second base substrate 421.

The first and second electrode layers 414 and 424 may be formed of a transparent conductive material such as indium tin oxide (ITO), indium zinc oxide (IZO), etc.

The liquid crystal layer 430 may include vertically aligned liquid crystal molecules 431.

The first and second electrode layers 414 and 424 control arrangement of liquid crystal molecules 431 of the liquid crystal layer 430 by generating an electric field in the liquid crystal layer 430 based on voltages applied thereto.

The optical modulation device 400 operates in 2D or 3D mode according to the voltages applied to the first and second electrode layers 414 and 424.

For example, the optical modulation device 400 operates in 2D mode when no voltage is applied to the first electrode layer 414 and the second electrode layer 424, and the optical modulation device 400 may operate in 3D mode when voltages are applied to the first electrode layer 414 and the second electrode layer 424.

Figure 5:
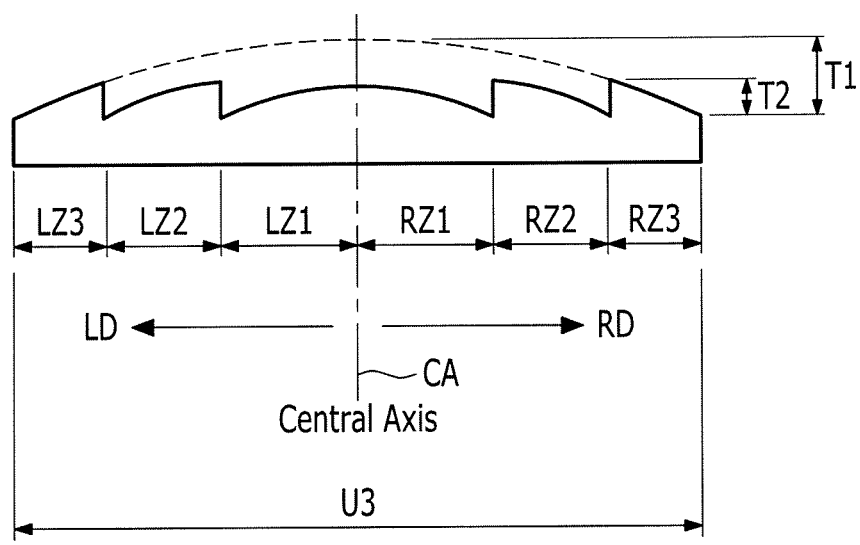
FIG. 5 illustrates shapes and phase delays of a unit element U3 illustrated in FIG. 3.

FIG. 5 illustrates shapes and phase delays of a unit element U3 illustrated in FIG. 3.

Since shapes of the plurality of unit elements U1 to U5 are substantially identical to each other, only a single unit element U3 will be described in FIG. 5, and descriptions of the remaining unit elements U1, U2, U4, and U5 will be omitted.

The single unit element U3 may have the same phase variation as a Fresnel lens when the liquid crystal molecules 431 are rearranged.

Specifically, the unit element U3 implements a Fresnel lens by defining discrete phase points boundary points by dividing an ideal phase delay surface by integer multiples of $2\pi$, a process known as wrapping.

That is, a Fresnel lens has a second thickness that is less than a first thickness T1 by adopting a phase delay surface of a convex lens.

Accordingly, the optical modulation device 400 may be operated as a Fresnel lens such that a cell gap is reduced to $1/K$ compared with that of a convex lens.

The K is a natural number corresponding to $n/2$ where n is the number of circular arcs included in the Fresnel lens.

By dividing an ideal phase delay surface, each unit element is split into a plurality of prism areas RZ1, RZ2, RZ3, LZ1, LZ2, and LZ3.

Right prism areas RZ1, RZ2, and RZ3 are formed to be symmetrical to left prism areas with respect to a central axis CA.

The plurality of prism areas RZ1, RZ2, RZ3, LZ1, LZ2, and LZ3 may be a plurality of annuli that have their own curvatures and whose boundaries are concentric circles that have smaller intervals therebetween further from the central axis CA.

In addition, as shown in FIG. 5, widths, hereinafter referred to as pitches of the right prism areas RZ1, RZ2, and RZ3 become smaller in a right direction RD further from the central axis CA, while pitches of the left prism areas LZ1, LZ2, and LZ3 become smaller in a left direction LD, which is opposite to the right direction RD, further from the central axis CA.

FIG. 5 illustrates one example of the present disclosure in which there are three prism areas to both the left and the right of the central axis CA, but embodiments of the disclosure are not limited thereto, and number of prisms may nary according to various factors such as resolution, etc.

As shown in FIG. 5, each of the prism areas RZ1, RZ2, RZ3, LZ1, LZ2, and LZ3 of the unit elements U1 to U5 has a shape in which the phase delay increases closer to the central axis CA.

By having such a shape, each of the unit elements U1 to U5 may refract light passing through the unit elements U1 to U5 so that the light is concentrated on a focal point through diffraction, destructive interference, and constructive interference.

An optical modulation device configured to operate as a Fresnel zone plate according to an exemplary embodiment of the present disclosure 400 will now be described with reference to FIG. 6.

The optical modulation device 400 may be referred to as a switchable zone plate.

Figure 6:
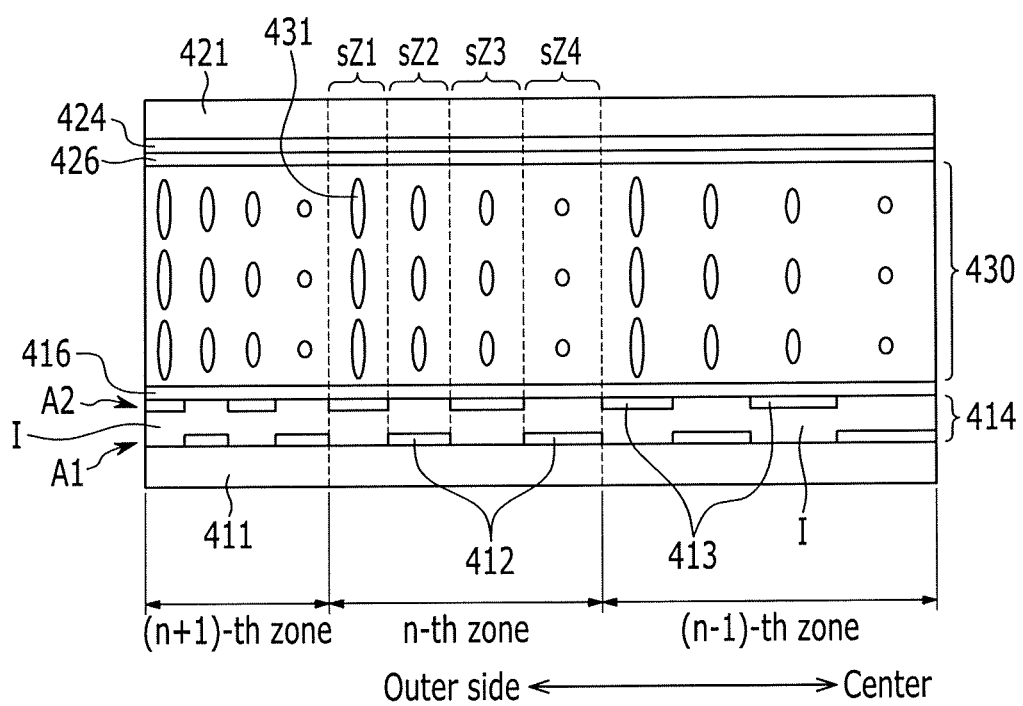
FIG. 6 is a partial cross-sectional view of an optical modulation device configured to operate as a Fresnel zone plate according to an exemplary embodiment of the present disclosure.

FIG. 6 illustrates three prisms to the left of a central axis, that is, three zones LZ1, LZ2, and LZ3 that are included in a unit element of the optical modulation device 400.

The optical modulation device 400 includes a liquid crystal layer 430 between first and second plates 410 and 420 that face each other.

The first plate 410 includes a first base substrate 411, a first electrode layer 414, and a first alignment layer 416.

The second plate 420 includes a second base substrate 421, a second electrode layer 424, and a second alignment layer 426.

The first electrode layer 414 includes a first electrode array A1 that includes a plurality of first electrodes 412, and a second electrode array A2 that includes a plurality of second electrodes 413.

The first electrode array A1 and the second electrode array A2 are insulated from each other by an insulating layer I to form a dual electrode structure.

The first electrode 412 and the second electrode 413 are alternately disposed in a first direction, and may not substantially overlap each other.

In FIG. 6, although edges of adjacent first and second electrodes 412 and 413 are illustrated so that they do not overlap each other, some edges may partially overlap each other.

Horizontal widths of the first electrode 412 and the second electrode 413, intervals between the first electrodes 412, and intervals between the second electrodes 413 may gradually decrease further from the center of the unit lens, and may gradually decrease further from a center of each of the zones LZ1, LZ2, and LZ3.

Unlike as shown in FIG. 6, the horizontal widths of the first electrode 412 and the second electrode 413 included in the single zone may be fixed, and the number of electrodes 412 and 413 included in each respective zone may decrease with increasing distance from a center of the unit lens.

In every zone, the horizontal widths of the first electrode 412 and the second electrode 413 may be greater than or equal to a cell gap of the liquid crystal layer 430.

However, there are limits to decreasing the cell gap due to processing limitations and the refractive index of the liquid crystals.

For purposes of explanation, let a pair of first electrodes 412 and a pair of second electrodes 413 be disposed in each zone of the unit lens, such as in an (n−1)-th zone LZ1, an n-th zone LZ2, and an (n+1)-th zone LZ3.

In each zone of the unit lens, regions where the electrodes 412 and 413 are disposed form sub-zones sZ1, sZ2, sZ3, and sZ4, respectively.

Within the single zone, such as LZ2, the sub-zones are sequentially represented as sZ1, sZ2, sZ3, and sZ4 from the outermost side to the center.

FIG. 6 shows that a single zone includes the four sub-zones sZ1, sZ2, sZ3, and sZ4, but this arrangement is exemplary and non-limiting, and the number of the sub-zones is not limited thereto.

The second electrode layer 424 is disposed on an entire surface of the second base substrate 421, may be supplied with a predetermined voltage such as a common voltage Vcom.

The second electrode layer 424 may be formed of a transparent conductive material such as ITO, IZO, etc.

The alignment layers 416 and 426 may be rubbed in a length direction that is perpendicular to width directions of the first and second electrodes 412 and 413, and which is perpendicular to a surface of the drawing, or in a direction that forms a predetermined angle therewith.

The rubbing directions of the alignment layers 416 and 426 may be opposite to each other.

The liquid crystal molecules 431 of the liquid crystal layer 430 may be initially aligned in a direction parallel to surfaces of the first and second plates 410 and 420, but alignment modes of the liquid crystal layer 430 are not limited thereto, so that vertical alignments, etc., may be possible.

Figure 7:
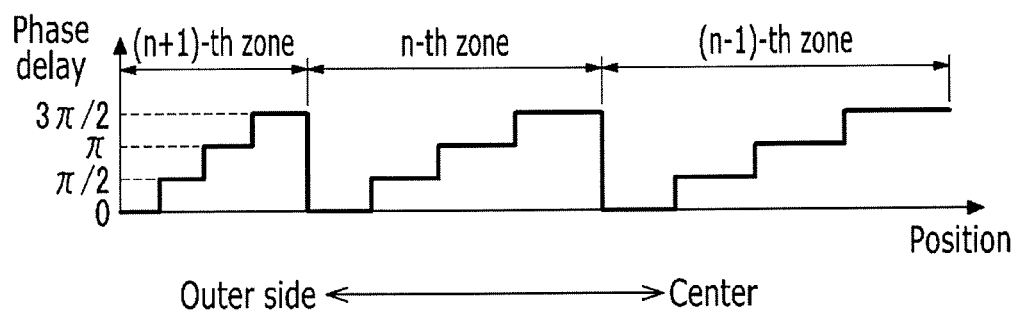
FIG. 7 illustrates phase delays generated according to positions in an optical modulation device illustrated in FIG. 6.

FIG. 7 illustrates phase delays generated according to positions in the optical modulation device illustrated in FIG. 6.

In each of an (n−1)-th zone LZ1, an n-th zone LZ2, and an (n+1)-th zone LZ3 of the unit lens, there are phase delay variations in four steps, increasing from 0 to $3\pi/2$ by steps of $\pi/2$.

In each of the plurality of zones, the phase delay gradually increases closer to the center from the outermost side.

The same sub-zone in each zones generates the same phase delay.

Slopes of the phase delay are perpendicular or vertical at zone boundaries.

The phase delays may be generated according to positions in the optical modulation device by adjusting an applied voltage.

However, it may be challenging to implement a phase delay with a vertical slope at the zone boundaries.

That is, it may be challenging to control the phase delay at the zone boundaries.

For easier control of the phase delay, the cell gap of the liquid crystal layer can be reduced, but there are limitations in how much a cell gap may be reduced due to processing limitations and the refractive index of the liquid crystals.

A two-step operation according to an exemplary embodiment of the present disclosure will now be described with reference to FIG. 8 and Table 1.

Figure 8:
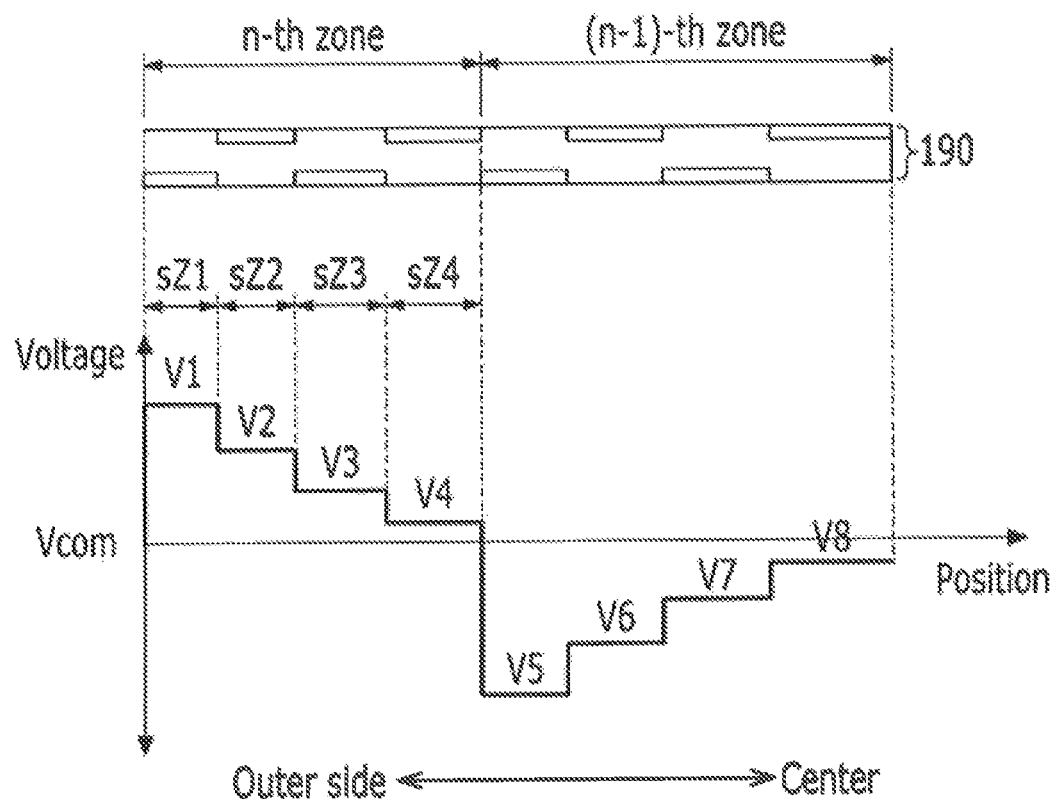
FIG. 8 illustrates final lens voltages to be applied to an electrode layer of an optical modulation device according to an exemplary embodiment of the present disclosure.

FIG. 8 illustrates final lens voltages to be applied to a first electrode layer 414 of an optical modulation device according to an exemplary embodiment of the present disclosure.

Referring to FIG. 8, a positive voltage with respect to a common voltage Vcom is applied to an n-th zone LZ2, and a negative voltage with respect to the common voltage Vcom is applied to an (n−1)-th zone.

A second electrode layer 424 is supplied with the common voltage Vcom.

As such, polarity of a voltage applied to the first electrode layer 414 with respect to the common voltage Vcom is inverted for every zone. Hereinafter, "polarity of the voltage applied to the first electrode layer with respect to the common voltage" is referred to as "polarity of the voltage applied to the first electrode layer".

Such space inversion of the voltage may involve time inversion in which, at a predetermined time interval, a positive voltage changes to a negative voltage and a negative voltage changes to a positive voltage.

The first electrode layer 414 of each zone receives stepwise voltages, differences of which with respect to the common voltage Vcom gradually decrease from the outermost side to the center.

Hereinafter, voltages applied to subzones sZ1, sZ2, sZ3, and sZ4 of the n-th zone LZ2 and the (n−1)-th zone LZ1 are sequentially represented as V1, . . . , and V8 from the outermost side to the center.

When polarities of voltages of the n-th zone LZ2 are positive and polarities of voltages of the (n−1)-th zone LZ1 are negative, a phase delay of the voltages V1 to V8 with respect to the common voltage Vcom may satisfy the following equation.

$$P(V1-Vcom)=P(V5-Vcom)$$

$$P(V2-Vcom)=P(V6-Vcom)$$

$$P(V3-Vcom)=P(V7-Vcom)$$

$$P(V4-Vcom)=P(V8-Vcom) \quad \text{[Equation 1]}$$

Herein, P(V) represents a phase delay experienced by light of a single specific wavelength that is vertically incident on the liquid crystal layer when upper liquid crystal directors of the corresponding electrode are rearranged due to voltage differences V between each electrode and the common electrode.

In each zone, a difference between the center voltage V4 or V8 applied to the centermost electrode and the common voltage Vcom is referred to as an offset voltage a: a =V4−Vcom or Vcom−V8.

As shown in FIG. 8, the offset voltage a is adjustable, and the offset voltage a may be different even in a single unit lens, depending on where the zones are located, and the offset voltage a may be zero.

When the offset voltage a is zero, V4=V8=Vcom can be satisfied.

A voltage difference dV=V4−V5 between the voltages V4 and V5 applied to the two electrodes adjacent to the zone boundary may be determined from a difference dVmax between the voltage V1 or V5 applied to the outermost electrode and the voltage V4 or V8 applied to the centermost electrode, so that dVmax=V1−V4 or V8−V5, and the offset voltage a, and the voltage difference dV may change even within a single unit lens depending on where the zones are located.

The voltage difference dV=V4−V5 between the voltages V4 and V5 applied to the two electrodes adjacent to the zone boundary may satisfy the following equation.

$$dV=dVmax+2a \quad \text{[Equation 2]}$$

The offset voltage a of zero may satisfy dV=dVmax.

Since it may be challenging to adjust the phase delay at zone boundaries, the phase delay that should implement a lens may not be properly generated.

However, as shown in FIG. 8, polarities of the voltages applied to the first electrode layer 190 may be inverted to generate an electric field at the boundary between adjacent zones, and the liquid crystal molecules of the liquid crystal layer 430 align in a direction perpendicular to the electric field, thereby decreasing transmittance at the zone boundaries.

However, since the voltage difference dV=V4−V5 between the voltages V4 and V5 applied to the two electrodes adjacent to the zone boundaries is large, both a horizontal field and a vertical field may be generated so that the liquid crystal molecules do not align in a desired direction.

Accordingly, after applying initial starting voltages to realign the liquid crystal molecules along the horizontal field between the zones LZ2 and LZ1 for a predetermined time t1, the final voltages illustrated in FIG. 8 are applied to prevent texture generation due to instability of the alignment of the liquid crystal molecules.

A set of initial starting voltages applied in a first step and a set of final lens voltages illustrated in FIG. 8 are summarized in Table 1 below.

TABLE 1

| | Location of zone | | | | | | | |
|---|---|---|---|---|---|---|---|---|
| | LZ2 | | | | LZ1 | | | |
| Location of Electrode | SZ1 | SZ2 | SZ3 | SZ4 | SZ1 | SZ2 | SZ3 | SZ4 |
| Initial starting voltage (1$^{ST}$ STEP) | (V1 − Vcom)/2 − V1 | $V_{COM}$ − V2 | $V_{COM}$ − V3 | $V_{COM}$ | (V5 − Vcom)/2 − V5 | $V_{COM}$ − V6 | $V_{COM}$ − V7 | $V_{COM}$ |
| Example of initial starting voltage (Vcom = 0) | 10 | 5 | 0 | 0 | −10 | −5 | 0 | 0 |
| Final lens voltage (2$^{ND}$ STEP) | V1 | V2 | V3 | V4 | V5 | V6 | V7 | V8 |
| Example of final lens voltage (Vcom = 0) | 10 | 5 | 3 | 2 | −10 | −5 | −3 | −2 |

That is, according to a driving method of an exemplary embodiment of the present disclosure, an absolute value of a difference in the starting voltages applied to the electrodes adjacent to the zone boundaries in a starting voltage application step (first step) is less than an absolute value of a difference in the lens voltages applied to the electrodes adjacent to the zone boundaries in a lens voltage application step (second step).

That is, in the starting voltage application step, among the final lens voltages applied to a single zone, a voltage less than the common voltage or the lens voltages may be applied to the electrodes of the sub-zones to which a voltage greater than and closest to the common voltage Vcom is applied.

When the offset voltage a is not zero, a voltage difference Vd1=|Vcom−V5| between voltages applied to the electrodes of the outermost sub-zone SZ1 of the centermost zone LZ1 and the centermost sub-zone SZ4 of the adjacent outward zone LZ2 in the starting voltage application step (first step) may be less than a voltage difference Vd1=|V4−V5| between voltages applied to the electrodes of the two sub-zones SZ4 and SZ1 in the final lens voltage application step (second step).

When the offset voltage a is zero, a voltage difference Vd2=|(Vcom−V3)−V5| between voltages applied to the electrodes of the outermost sub-zone SZ1 of the centermost zone LZ1 and the centermost sub-zones SZ3 and SZ4 of the adjacent outward zone LZ2 in the starting voltage application step (first step) may be less than a voltage difference Vd2=|V3−V5| between the voltages applied in the final lens voltage application step (second step).

For example, the electrode of the sub-zone SZ3 adjacent to the sub-zone SZ4 of the outer zone LZ2 may be supplied with a voltage that is less than the common voltage or the lens voltage V3.

In some cases, a voltage difference (Vd3=|(Vcom−V2)−V5|) between the voltages applied to the electrode of the outermost sub-zone SZ1 of the centermost zone LZ1 and the electrode of the sub-zone SZ2 of the zone LZ2, in the starting voltage application step (first step) may be set to be less than or equal to than a voltage difference (Vd3=|V2−V5|) of the voltages applied in the final lens voltage application step (second step).

For example, the electrode of the sub-zone SZ2, which is two sub-zones outward from the sub-zone SZ4 of the outer zone LZ2, may be applied with a voltage that is less than the common voltage or the lens voltage V2.

Meanwhile, in each zone, the electrode of the outermost sub-zone SZ1 may be directly supplied with the lens voltage even in the starting voltage application step, or more than half the voltage difference between the common voltage Vcom and the lens voltage ((V1−Vcom)/2).

The time t1 for applying the initial starting voltages may be a time in which the liquid crystal molecules 431 between the zones respond to the horizontal field for realignment.

The time t1 may have different values depending on the types of liquid crystals, but when considering characteristics of generic liquid crystals, less than 10 ms to 10 seconds will be sufficient.

Such space inversion of the voltage for each zone involves time inversion in which, at a predetermined time interval, a positive voltage changes to a negative voltage and a negative voltage changes to a positive voltage.

In the case of the time inversion, the starting voltages are applied only when initially changing to 3D mode, and subsequently, lens voltages may be applied through continuous time inversion.

Figure 9:
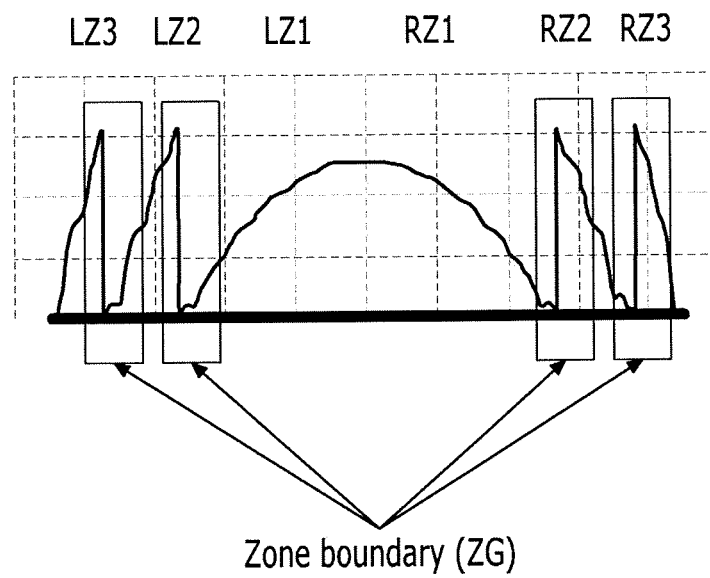
FIG. 9 illustrates a simulation result of a lens created when a two-step operation is performed by applying final lens voltages after applying starting voltages illustrated in Table 1 and measurement results using a phase interferometer.
Figure 9:
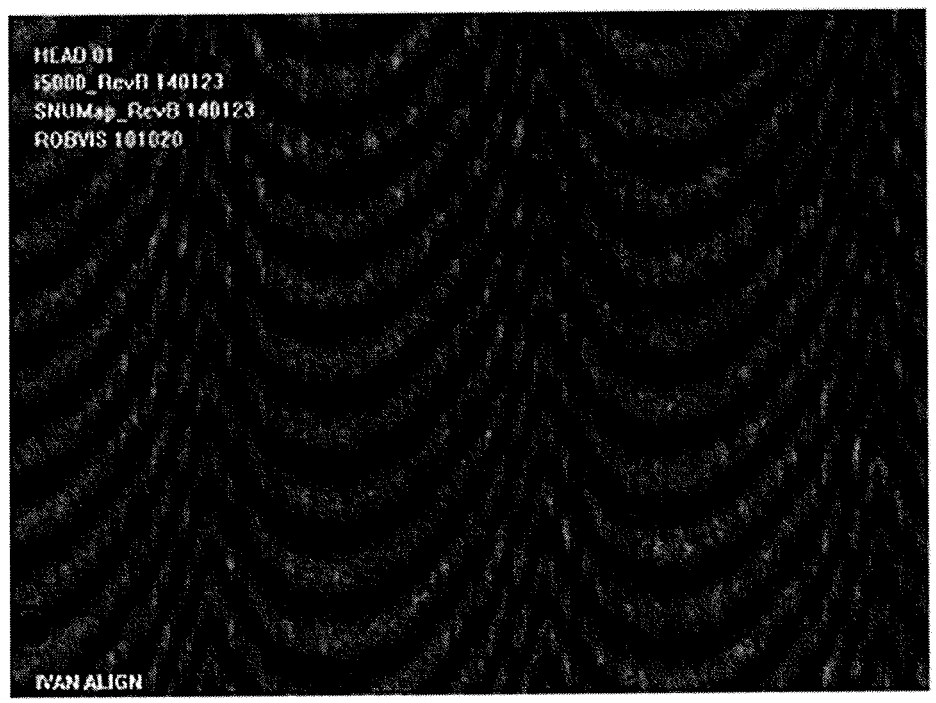

FIG. 9 illustrates a simulation result of a lens when final lens voltages are applied in a two-step operation after applying the starting voltages illustrated in Table 1, and measurement results using a phase interferometer.

Figure 10:
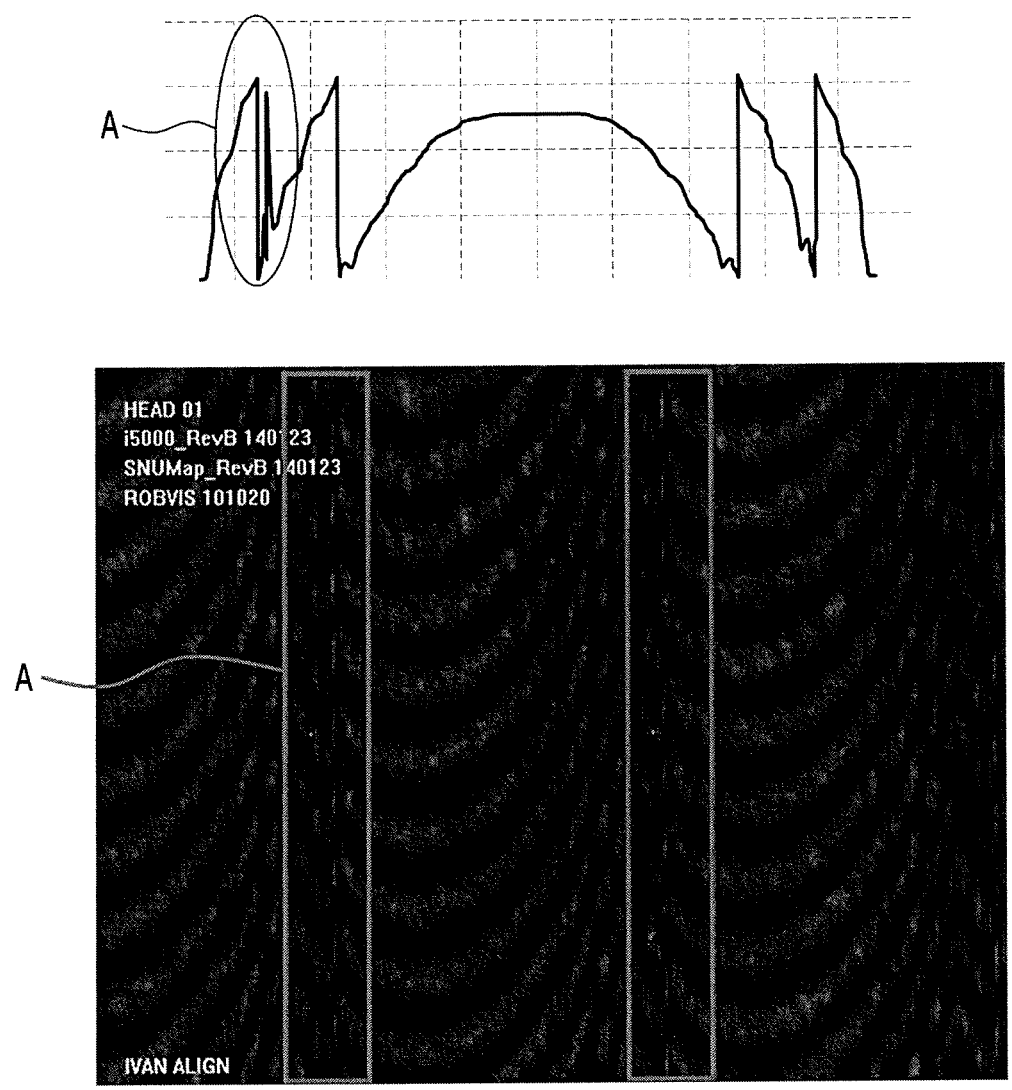
FIG. 10 illustrates a simulation result of a lens created when final lens voltages illustrated in Table 1 are directly applied to perform one-step operation and measurement results using a phase interferometer.

FIG. 10 illustrates simulation results of a lens created when the final lens voltages illustrated in Table 1 are directly applied to perform a one-step operation, and measurement results using a phase interferometer.

When comparing FIG. 9 and FIG. 10, when a two-step operation is performed according to an exemplary embodiment of the present disclosure, it can be seen that texture A of FIG. 10 generated by a conventional one-step operation does not occur and the liquid crystal molecules are aligned in the desired direction to realize the desired phase delay.

While this disclosure has been described with respect to what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of driving an optical modulation device, the optical modulation device comprising a first plate having a plurality of first electrodes, a second plate facing the first plate that includes a second electrode, and a liquid crystal layer interposed between the first and second plates that includes a plurality of liquid crystal molecules, wherein the optical modulation device configures a Fresnel zone plate wherein groups of adjacent electrodes of the plurality of electrodes define zones of the Fresnel zone plate, the method comprising:
   applying a common voltage to the second electrode layer;
   applying starting voltages to the first electrode layer in a first step to initiate a 3D displaying mode; and
   applying lens voltages to the first electrode layer in a second step, wherein
   polarities of the lens voltages with respect to the common voltage are inverted for every zone, and
   an absolute value of a difference between starting voltages applied to electrodes adjacent to a zone boundary in the first step is less than an absolute value of a difference between lens voltages applied to electrodes adjacent to a zone boundary in the second step.

2. The driving method of claim 1, wherein
   differences between lens voltages applied to the plurality of electrodes and the common voltage decrease from an outermost side of a zone to a side closest to a center of the zone plate, and,
   in the second step, a lens voltage less than the common voltage is applied to those electrodes to which a voltage greater than and closest to the common voltage Vcom was applied in the first step.

3. The driving method of claim 2, wherein, in the first step, the common voltage is applied to a centermost electrode of the zone, which is the electrode of the zone closest to a center of the Fresnel zone plate.

4. The driving method of claim 3, wherein a voltage less than the common voltage or a corresponding lens voltage is applied to an electrode outward from and adjacent to the centermost electrode of the zone.

5. The driving method of claim 2, wherein
   the common voltage is applied as the lens voltage to the centermost electrode of the zone, and
   a lens voltage greater than the common voltage and closest to the common voltage is applied to an electrode that is outward from and adjacent to a centermost electrode of the zone, which is the electrode of the zone closest to a center of the Fresnel zone plate.

6. The driving method of claim 2, wherein, the lens voltages generate a phase delay in each zone, and lens voltages applied to corresponding electrodes of each zone generate the same phase delay for each zone.

7. The driving method of claim 1, wherein, in every zone, a voltage difference dV of the lens voltages applied to two electrodes of the plurality of electrodes adjacent to a zone boundary is determined from a difference dVmax between
   the lens voltage applied to an outermost electrode of the zone and
   the lens voltage applied to the centermost electrode of the zone, and an offset voltage a that is a difference between the lens voltage applied to the centermost electrode of the zone and the common voltage.

8. The driving method of claim 7, wherein,
the voltage difference dV of the lens voltages applied to the two electrodes adjacent to the zone boundary is dV=dVmax+2a.

9. The driving method of claim 1, wherein,
the voltage difference dV of the lens voltages applied to two electrodes of the plurality of electrodes adjacent to a zone boundary is determined such that a transmittance at the zone boundary is below a predetermined value.

10. The driving method of claim 1, wherein polarities of the lens voltages are inverted for every zone and at a predetermined time interval through time inversion, wherein a positive polarity changes to a negative polarity and a negative polarity changes to a positive polarity.

11. An optical modulation device, comprising:
a first plate that includes a plurality of first electrodes;
a second plate facing the first plate and that includes a second electrode; and
a liquid crystal layer interposed between the first and second plates that include a plurality of liquid crystal molecules,
wherein the optical modulation device configures a Fresnel zone plate wherein groups of adjacent electrodes of the plurality of electrodes define zones of the Fresnel zone plate, wherein
a common voltage is applied to the second electrode,
starting voltages are applied to the plurality of first electrodes in a first step to initiate a 3D display mode,
lens voltages are applied to the plurality of first electrodes in a second step,
polarities of the lens voltages with respect to the common voltage are inverted for every zone, and
an absolute value of a difference between starting voltages applied to first electrodes adjacent to a zone boundary in the first step is less than an absolute value of a difference of the lens voltages applied to first electrodes adjacent to a zone boundary in the second step.

12. The optical modulation device of claim 11, wherein the plurality of first electrodes comprise two arrays of electrodes insulated from each other.

13. The optical modulation device of claim 11, wherein widths of the plurality of first electrodes become smaller closer to the outer zones of the Fresnel zone plate.

14. The optical modulation device of claim 11, wherein the widths of the first electrodes are identical in every zone.

15. The optical modulation device of claim 11, wherein the first plate and the second plate respectively further include a first alignment layer and a second alignment layer for aligning the liquid crystal molecules of the liquid crystal layer.

16. The optical modulation device of claim 11, wherein
differences between lens voltages applied to the plurality of electrodes and the common voltage decrease from an outermost side of a zone to a side closest to a center of the zone plate, and,
in the second step, a lens voltage less than the common voltage is applied to those electrodes to which a voltage greater than and closest to the common voltage Vcom was applied in the first step, and
wherein, the lens voltages generate a phase delay in each zone, and lens voltage applied to corresponding electrodes of each zone generate the same phase delay for each zone.

17. The optical modulation device of claim 16, wherein, in the first step, the common voltage is applied to a centermost electrode of the zone, which is the electrode of the zone closest to a center of the Fresnel zone plate,
wherein a voltage less than the common voltage or a corresponding lens voltage is applied to an electrode outward from and adjacent to the centermost electrode of the zone.

18. The optical modulation device of claim 16, wherein
the common voltage is applied as the lens voltage to the centermost electrode of the zone, and
a lens voltage greater than the common voltage and closest to the common voltage is applied to an electrode that is outward from and adjacent to a centermost electrode of the zone, which is the electrode of the zone closest to a center of the Fresnel zone plate.

19. The optical modulation device of claim 11, wherein, in every zone,
a voltage difference dV of the lens voltages applied to two electrodes of the plurality of first electrodes adjacent to a zone boundary is determined from a difference dVmax between
the lens voltage applied to the electrode of an outermost zone and
the lens voltage applied to the electrode of the centermost zone, and
an offset voltage a that is a difference between the lens voltage applied to the electrode of the centermost zone and the common voltage,
wherein dV=dVmax+2a.

20. An optical display device, comprising
optical modulation device that includes
a first plate that includes a plurality of first electrodes;
a second plate facing the first plate and that includes a second electrode; and
a liquid crystal layer interposed between the first and second plates that include a plurality of liquid crystal molecules,
wherein the optical modulation device configures a Fresnel zone plate wherein groups of adjacent electrodes of the plurality of electrodes define zones of the Fresnel zone plate,
wherein a common voltage is applied to the second electrode,
starting voltages are applied to the plurality of first electrodes in a first step to initiate a 3D display mode,
lens voltages are applied to the plurality of first electrodes in a second step,
polarities of the lens voltages with respect to the common voltage are inverted for every zone, and
an absolute value of a difference between starting voltages applied to first electrodes adjacent to a zone boundary in the first step is less than an absolute value of a difference of the lens voltages applied to first electrodes adjacent to a zone boundary in the second step.

21. The method of claim 1, wherein a time for applying the starting voltages to the first electrode layer is 10 ms to 10 seconds.

* * * * *